July 3, 1962  H. L. WILLIAMS  3,042,745
LINE TIE
Filed Aug. 31, 1959  4 Sheets-Sheet 1
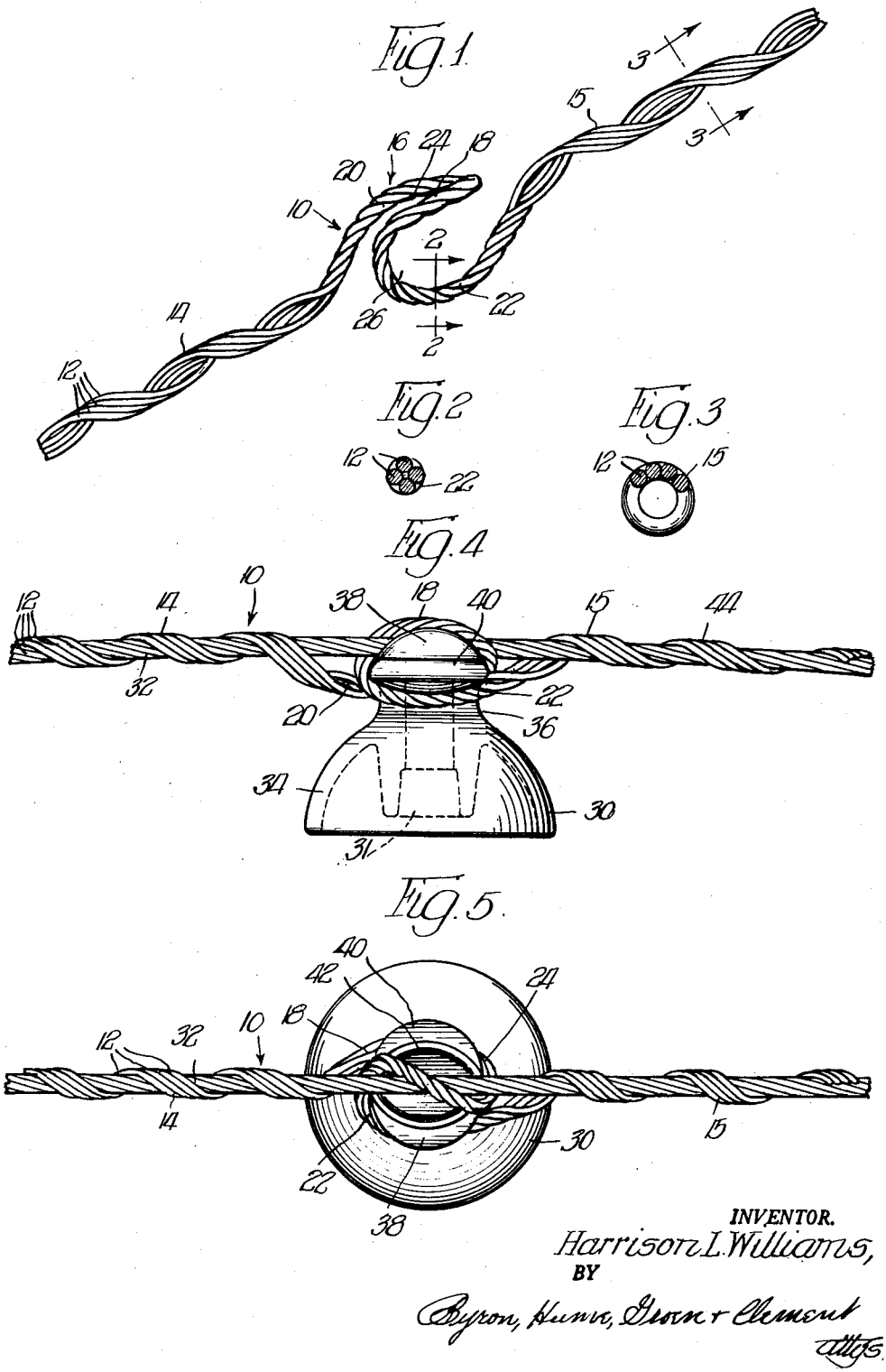
INVENTOR.
Harrison L. Williams,
BY
Byron, Hume, Groen & Clement
ATTYS July 3, 1962

H. L. WILLIAMS 3,042,745

LINE TIE

Filed Aug. 31, 1959

INVENTOR.
Harrison L. Williams,
BY
Byron, Hume, Groen + Clement.
Attys

July 3, 1962 H. L. WILLIAMS 3,042,745
LINE TIE
Filed Aug. 31, 1959 4 Sheets-Sheet 3
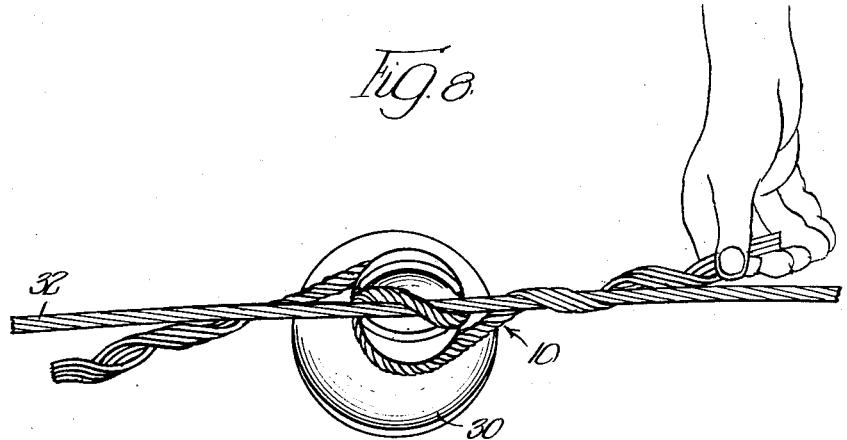
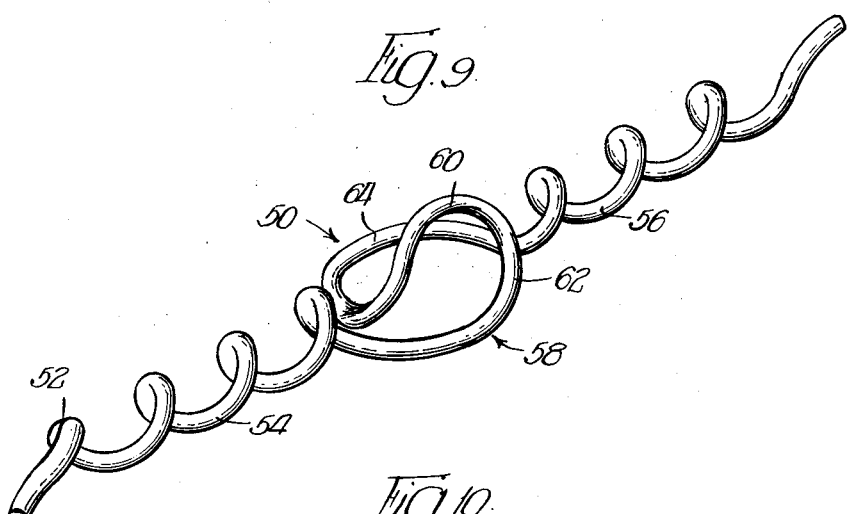
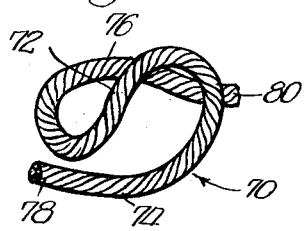
INVENTOR.
Harrison L. Williams,
BY
Byron, Hume, Groen + Clement
Attys

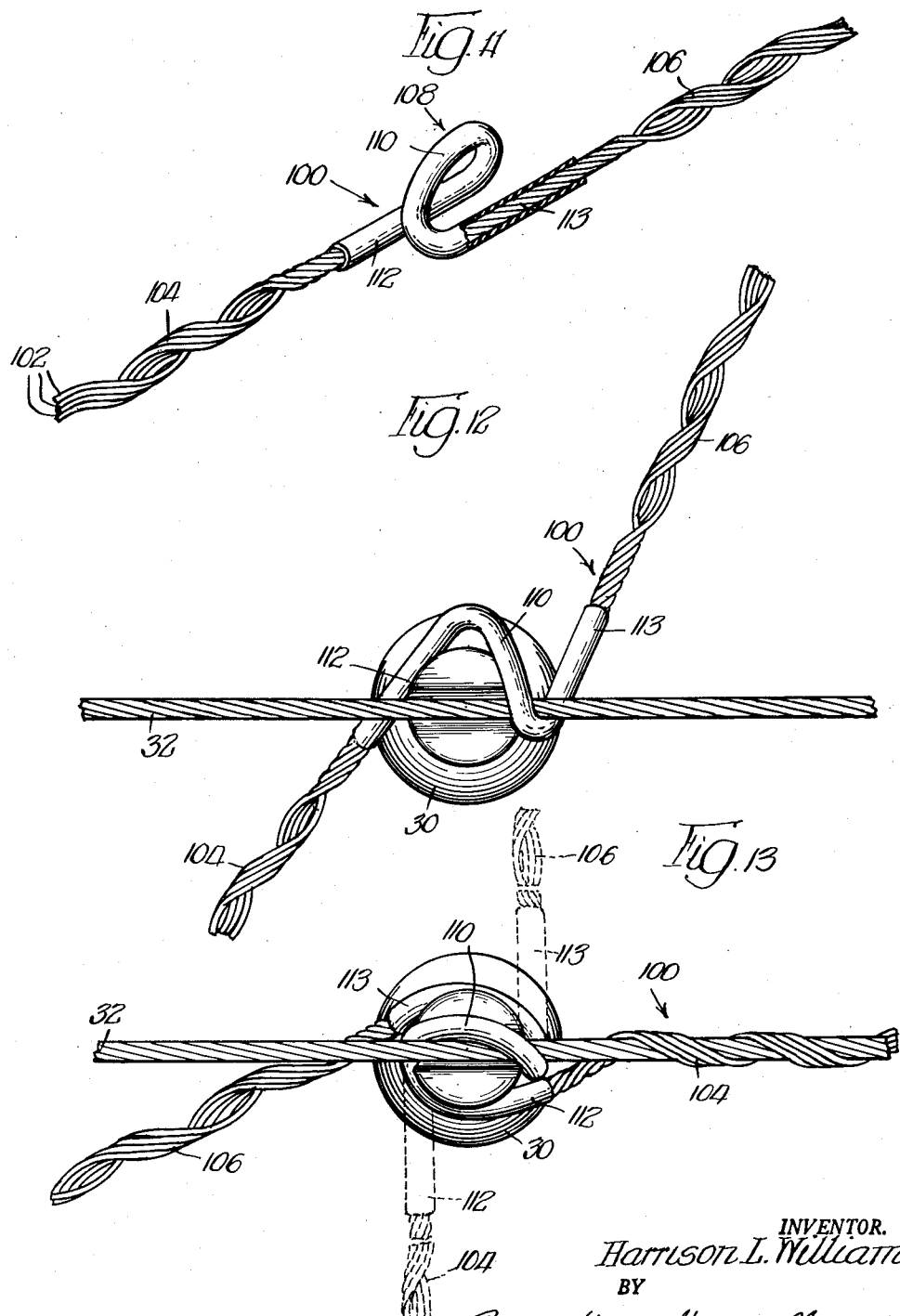

United States Patent Office 3,042,745
Patented July 3, 1962

3,042,745
LINE TIE
Harrison L. Williams, Euclid, Ohio, assignor to Preformed Line Products Company, Cleveland, Ohio, a corporation of Ohio
Filed Aug. 31, 1959, Ser. No. 837,095
11 Claims. (Cl. 174—173)

This invention pertains to appliances to be used in connection with linear bodies such as electrical conductors, cables, stranded ropes and the like, and in particular relates to means for securing such linear bodies to various types of suspension devices.

The method by which electrical conductors and other types of linear bodies are secured to suspending devices is of considerable importance. One method widely used in the past is the lashing of the conductor to the support by means of a wire. This method has several disadvantages which render it unsuitable. For example, it is generally desirably that the lashing member grip the conductor relatively tightly so as to secure it against axial displacement. It is well known that with wires this gripping relationship is extremely difficult to achieve and even more difficult to maintain unless auxiliary clamping devices are used. Since the lashing member must be relatively pliable in order that it may be easily wrapped around the conductor and the suspension device, it has little or no natural resiliency. For this reason vibrations of the conductor distort the lashing wire and tend to cause it to loosen at the ends until it no longer grips the conductor in the desired manner. Consequently it is necessary to secure or anchor the ends of the lashing by some auxiliary device.

Another widely used method utilizes clamps for securing the conductor to the suspension member. While clamps do meet the problem of gripping, they have at least one disadvantage which limits their practicality. Specifically, most clamps, particularly the gripping members or jaws, are relatively rigid and consequently prevent flexing of the conductor within the gripping portions. It is well known that electrical conductors are generally in a state of constant vibration as the result of the wind and other climatic forces to which they are subjected. Thus, there is a sharp line of demarcation between the free portion of the conductor which is being flexed or vibrated and that which is not flexed due to the restraint of the gripping members of the clamping device. This line of demarcation results in an area or point of stress concentration which leads to fatigue failure of the conductor.

For this reason it has been found desirable to provide a device for lashing the electrical conductor to the suspending means which has the gripping qualities of the clamp but at the same time eliminates the stress concentration inherent therein.

A still further consideration relative to the lashing devices is the facility with which they may be assembled and disassembled on the conductor. In most instances the assembly and disassembly takes place at an elevated position such as the top of a tower or on a cross-arm from which the conductor is suspended. For this reason the lineman may have to operate in a limited space and all the while maintain a rather precarious balance. Consequently, it is desirable that the device be assembled and disassembled with relative ease and facility.

A foremost feature and object of this invention resides in the provision of an appliance for securing linear bodies, such as electrical conductors, cables, stranded ropes and the like, to a suspension means. A still further feature and object of the invention resides in the provision of a device for securing linear bodies to suspension devices that minimizes stress concentration and permits a tightly gripping relationship with the linear body without the use of auxiliary means.

A still further object of the invention resides in the provision of a device for securing linear bodies to various types of suspension devices that may be easily assembled and disassembled with the linear body and suspension device without any special tools or skills.

These and other objects of the invention will be apparent upon reading of the specification with reference to the following drawings.

In the drawings:

FIGURE 1 is a perspective view of one preferred form of the appliance embodying the invention.

FIGURE 2 is a sectional view taken along the lines 2—2 in FIGURE 1.

FIGURE 3 is a sectional view taken along the lines 3—3 in FIGURE 1.

FIGURE 4 is a side view in elevation of the appliance shown in FIGURE 1 assembled to an electrical conductor and a pin type insulator.

FIGURE 5 is a plan view in elevation of the assembly shown in FIGURE 4.

FIGURES 6, 7 and 8 illustrate a preferred method for assembling the appliance to the electrical conductor and insulator shown in FIGURES 4 and 5.

FIGURE 9 is another preferred form of the appliance embodying the invention.

FIGURE 10 is a further preferred form of the appliance embodying the invention.

FIGURE 11 is a still further preferred form of the appliance embodying the invention.

FIGURES 12 and 13 illustrate a preferred method for assembling the appliance with an electrical connector and insulator.

Figure 6:
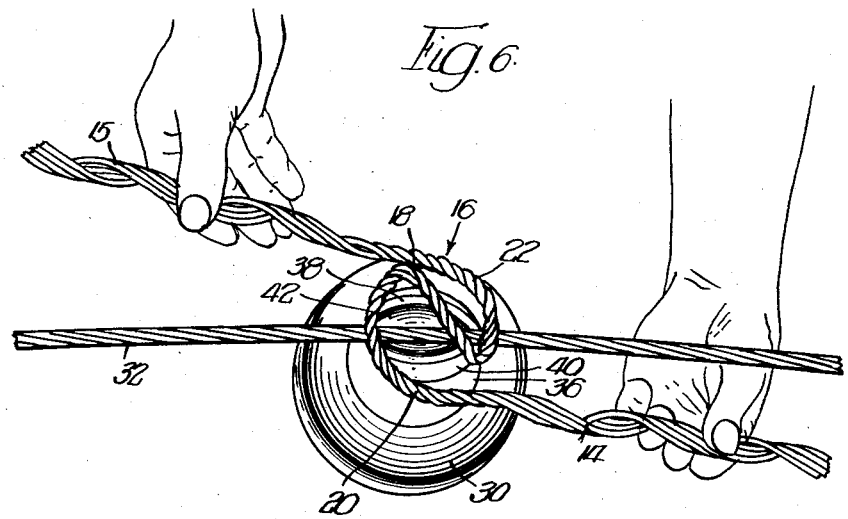

Although the specification will for the most part be in terms of electrical conductors, it is to be understood that this is merely by way of example without limitation, and that the invention is applicable to linear bodies in general.

Referring now to FIGURE 1, there is shown a preferred form of the appliance embodying the invention, generally denoted by the numeral 10. In this instance the appliance 10 is constructed of a plurality of reinforcement elements 12 which have been helically preformed or preshaped for at least a portion of their lengths. The helically preformed portions 14 and 15 are similar to those that are utilized in the construction of other appliances such as those disclosed in United States Letters Patents to Thomas F. Peterson, e.g., 2,609,653 and 2,761,273, and may be made by any suitable method such as that disclosed in United States Letters Patent 2,691,865. The helically preformed elements may be made of any suitable material that has sufficient strength, resiliency, and flexibility, to meet the requirements of the lashing. Generally the lashing or reinforcement members will be made of aluminum, steel or similar metals, although molded plastics and the like may be used in certain special instances.

The helically preformed portions 14 and 15 are preferably formed to have a pitch length sufficiently long that they may be applied sideways to an electrical conductor without exceeding their elastic limits. The internal diameter of the helical portions will in most instances be somewhat less than the external diameter of the conductor so that they are forced to resiliently expand to accommodate the latter. In this manner it is possible to achieve a tightly gripping relationship between the helices and the conductor.

In the preferred embodiment shown in FIGURE 1 the appliance is constructed of four mutually conforming reinforcement elements 12 in bridging relationship throughout the helical portions 14 and 15 so as to form a helical band. When constructed in this manner it is desirable that the helical pitch length be sufficient so that the band formed by the reinforcement members 12 can be applied to the electrical conductor without exceeding the elastic limit of the members 12 from its side. It may be desirable in some instances that the members 12 be secured in their bridging relationship by means of an adhesive, solder, brazing compound or the like.

Intermediate the helically preformed portions 14 and 15 the reinforcement members 12 have been formed into a closed helix which constitutes the linear portion 16 as shown in FIGURES 1 and 2. The portion 16 may be constructed by first assembling four of the helically preformed elements 12 into the desired bridging relationship and then intertwisting them at their central portions to form the closed helix.

As shown in the drawing, the portion 16 includes a section 18 which lies intermediate the helically preformed portions 14 and 15. The portion 16 is return bent at each end of the section 18 with the re-entrant portions 20 and 22 co-operating to form the bights 24 and 26. In this instance the axis of the re-entrant portions 20 and 22 lie in a plane which is spaced from the apex of the portion 18. However, it will be apparent later on that the axis of portions 18, 20 and 22 may lie in the same plane when the appliance is not assembled with a suspension device.

Referring now to FIGURES 4 and 5, there is shown an appliance assembled to a pin type insulator 30 and a conductor 32. It should be noted that while the appliance as shown is used in conjunction with a pin type insulator, other types of suitable suspension devices may also be used where desirable and irrespective of whether the suspension device is above, below, or to the side of the conductor. The pin type insulator 30 may be constructed of any suitable insulating material such as glass or ceramic, and is adapted to be mounted on the cross-arm of a line pole or tower (not shown) by means of a pin (not shown) which is received in the recess 31. The insulator includes the flared skirt 34 which prevents moisture accumulating between the supporting arm or pin and the insulator so as to minimize the danger of short circuit. The insulator 30 further includes the neck portion or annular recess 36, the head portion 38, and collar 40. The head portion 38 is provided with the groove 41 which acts as a saddle 42 for the conductor 32.

When the appliance 10 is assembled to the insulator 30 and the conductor 32, it can be seen that the portion 18 crosses the latter. The re-entrant portions 20 and 22 embrace the neck 36 of the insulator 30 and are prevented from slipping upwardly by the collar 40.

The appliance 10 is preferably constructed so that the repose distance between the re-entrant portions 20 and 22 and the intermediate portion 18 is substantially less than that required to span the distance between the saddle 42 and the neck 36. In this manner re-entrant portions 20 and 22 are flexed against their natural resilience so that the portion 18 is forced tightly against the face of the saddle 42 and the head 38, thus binding the conductor 32 in the saddle. As a result of the binding by the intermediate portion 18 the conductor 32 is constrained against any movement that would tend to dislodge it from the saddle 42.

It is apparent that preferably the re-entrant portions should not have to flex a distance substantially greater than that which would exceed their elastic limit. This factor would be an important consideration in the construction and dimensions of any appliance to be used in a specific installation.

The end portions 14 and 15 of the appliance 10 extend along the conductor 32 in encircling relationship therewith. In this instance they are shown as being in gripping engagement with the conductor 32 so that there is substantially no axial play of the conductor relative to the insulator 30. It may be desirable in some instances that the conductor 32 be permitted relative axial movement in which case the internal diameter of the helically preformed portions 14 and 15 is larger than the over-all diameter of the conductor.

It will be noted in this embodiment that the hand of lay of the helically preformed portions 14 and 15 is the same, although in some instances it may be desirable that they be of opposite hands.

Figure 7:
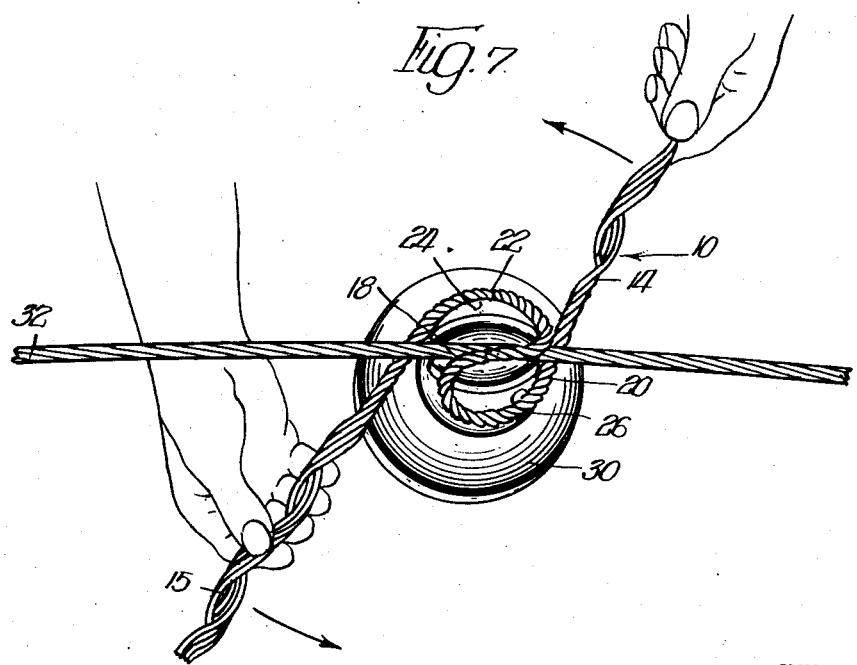

Referring now to FIGURES 6, 7 and 8, there are shown steps comprising a method especially suited for the assembly of the appliance to a pin type insulator 30 and an electrical conductor 32. The first step consists of centering the linear portion 16 of the appliance upon the insulator 30. The helically preformed portions 14 and 15 are then placed under the electrical conductor so that the re-entrant portions 20 and 22 adjacent the mouths of the respective bights 24 and 26 engage under the collar 40 of the insulator. The end portions 14 and 15 are then rotated 180 degrees about the center in the manner shown in FIGURE 7 so that the conductor 32 moves into the bights 24 and 26. When the appliance 10 has been rotated the full 180 degrees, as shown in FIGURE 8, the helically preformed portions 14 and 15 are then rotated about the conductor 32, until they are in encircling relationship therewith.

It can now be seen that the appliance 10 may be applied with relative ease without any special skills or tools. It may be desirable in some instances, particularly where the appliance is being applied to heavy cables and is constructed of relatively heavy reinforcement elements to utilize a simple prying instrument such as a screwdriver or the like, to aid in the wrapping of the helices about the conductor 32. The application of the portion 16, however, normally will not require the use of any tools and may be accomplished by the simple procedure outlined with respect to FIGURES 6–8.

The disassembly of the appliance may be accomplished by reversing the steps set forth for the assembly. Specifically, the helically preformed portions 14 and 15 are first unwrapped from the conductor 32 and then the appliance is rotated 180 degrees about the insulator 30 so that the re-entrant portions 20 and 22 no longer engage under the collar 40. The appliance 10 may then be completely removed from the insulator 30.

It is now apparent that the subject invention has the further feature of acting as a vibration damper for the conductor. When the conductor is vibrated, the helical portions will also tend to vibrate as the result of their natural flexibility. Their resilience at the same time will tend to resist these vibrations and consequently will act as a vibration damper. Thus, because the reinforcement members are flexible, they will provide the damping effect with a minimum of stress concentration.

The appliance has been described hereinbefore as being constructed of a plurality of reinforcement elements which have been helically preformed for a portion of their lengths and are maintained in substantially bridging relationship. It will be apparent that the number of elements used may vary and that this invention is not limited to any specific number. Generally the number of elements should be such that they constitute a helical band of open pitch which may be readily applied to an electrical conductor without exceeding their elastic limit.

In FIGURE 9 there is shown a modification of the invention which is generally denoted by the numeral 50 and is constructed of a single element 52. The element 52 may be formed from any suitable material such as plastic, metal, or a combination of metal coated with plastic or suitable insulating material of any desired cross-sectional configuration. The appliance 50 is of round cross-section and includes the helically preformed portions 54 and 56 and the intermediate portion generally denoted by the numeral 58. The intermediate portion 58 includes the section 60 which is return-bent at each end to form the re-entrant portions 62 and 64. The appliance 50 may be assembled and disassembled to the insulator and the electrical conductor in the same manner described with reference to FIGURES 6–8. This modification is particularly suitable where the loads and forces are relatively light.

As was mentioned previously, in some instances it is not necessary to prevent axial movement of the conductor with respect to the insulator 30. In these instances it may be possible to dispense with the helically preformed portions of the appliance, as shown in FIGURE 10, and generally denoted by the numeral 70. Thus, where it is merely necessary to prevent radial movement of the conductor with respect to the insulator and to prevent dislodgement of the conductor, the intermediate portion 72 in co-operation with the re-entrant portions 74 and 76 will grasp the insulator with sufficient force that the conductor will be prevented from becoming dislodged. The appliance 70 may be applied in substantially the same manner as described with reference to FIGURES 6–8 except that it is obviously not necessary to follow the step of placing the helically preformed portion in encircling relationship. Thus it is merely necessary to center the re-entrant portions 74 and 76 on the insulator so that the ends 78 and 80 are under the collar thereof and then rotate the appliance 180 degrees until the portions 74 and 76 are in engaging position.

It is also conceivable that the invention may be constructed with one helical portion as well as none or two.

It will be noted that the cable gripping helical portions not only prevent axial movement but that they also help lock the center portions to the insulators. When the helical portions are forced into the conductor encircling relationship, they exert a scissors-like grip upon the insulator whereby the re-entrant portions are forced more tightly into the neck 36. Thus, the embodiments shown in FIGURES 1 and 9 are particularly suitable where heavy loads and forces are encountered and the modification shown in FIGURE 10 is particularly suitable for installations involving relatively light loads and forces.

Referring now to FIGURE 11, there is shown another preferred form of the invention generally denoted by the numeral 100. This preferred form is shown by way of illustration and not limitation as being constructed of a plurality of linear reinforced elements 102 which include the helically preformed portions 104 and 106. As was stated previously with respect to the embodiment generally denoted by the numeral 10, the helically preformed portions 104 and 106 are constructed with sufficiently open pitch so that they may be applied sideways to a conductor without substantially exceeding the elastic limit of the material from which they are constructed. Intermediate the helical portions 104 and 106 is the insulated gripping portion generally denoted by the numeral 108, which consists of a closed helix. The insulator gripping portion 108 consists of a transverse portion 110 which is bent at each end to form the re-entrant portions 112 and 113. The re-entrant portions 112 and 113, as can be seen from the drawing, lie substantially along the axes of their respective helical portions 104 and 106 and are in spaced relationship. In the preferred form, the transverse portion 110 is substantially equal or slightly greater than the diameter of the insulator to which it is adapted to be applied as will be seen later on.

Referring now to FIGURES 12 and 13, there is shown a preferred method for assembling the appliance shown in FIGURE 11 to an insulator and a conductor. The first step consists of centering the transverse element portion 110 on the insulator 30 and then placing the helical portions 104 and 106 under the conductor 32 as shown in FIGURE 12. The re-entrant portions 112 and 113 are likewise positioned so as to slide under the collar 40 when the appliance is rotated. The appliance 100 is then rotated about the insulator 30 as shown in FIGURE 13 until the helical portions 104 and 106 are substantially 90° to the conductor 32 at which time the re-entrant portions 112 and 113 are tangential to the neck of the insulator, as indicated by the dotted lines. The transverse portion 110 is then in its locking position within the saddle 42 of the insulator 30 and overlies the conductor 32 so that it abuts the conductor on opposite sides adjacent its ends. Thus the transverse portion 110 is in its desired portion and may not be rotated any further due to abutment with the conductor 32. At this point, the helical portions are then forced into engagement with the conductor 32 which causes their respective re-entrant portions 112 and 113 to be bent about the insulator 30 until they are in an embracing relationship with its neck 36. The bending of the re-entrant portions may exceed their elastic limits somewhat so that if the appliance were removed from the insulator, the re-entrant portions would no longer be of a substantially straight construction but actually might appear somewhat similar to the embodiment shown in FIGURE 1.

It may be desirable in some instances to provide at least a portion of the appliance with some type of a jacket or coating. In the appliance shown in FIGURES 11, 12 and 13 the intermediate or insulator gripping portion 108 is provided with a jacket of some suitable material such as neoprene. The neoprene reduces abrasion between the appliance, particularly with the portion thereof lying within the saddle of the insulator, and the electrical conductor.

It will be noted where the intermediate portions are constructed of a plurality of intertwisted reinforcement elements and they are not provided with a coating or a jacket, that the hand of lay may be either in the same or opposite direction with that of the conductor if the latter is stranded. It may also be desirable to provide the helical portions of the appliances with a friction producing material such as aluminum oxide grit, so that they will more tightly grip the conductors. The grit may be secured to the internal faces of the linear elements by any suitable means such as adhesive, glue, or the like.

Although certain specific embodiments have been used in illustrating the invention along with specific terminology, it is to be understood that this is merely by way of example and in no manner is to be construed as a limitation. It is contemplated that certain modifications may be made within the scope of the claims without departing from the spirit of the invention.

I claim:

1. An appliance for securing a linear body to a mounting device comprising a linear element preshaped to include two laterally spaced portions lying in a common plane for at least a portion of their lengths and axially coextensive for at least a portion of their lengths, and an intermediate portion diagonally connecting opposite ends of said spaced portions, said intermediate portion having an arched shape so as to project from said common plane.

2. An appliance for securing a linear body to a mounting device comprising a linear element preshaped to include two laterally spaced portions lying in a common plane for at least a portion of their lengths and axially coextensive for at least a portion of their lengths, and an intermediate portion diagonally connecting opposite ends of said spaced portions, said intermediate portion having an arched shape so as to project from said common plane, said spaced portions being helically preshaped adjacent their other ends.

3. An appliance as defined in claim 1 in which said spaced portions are substantially parallel.

4. An appliance as defined in claim 1 in which said spaced portions are arcuate shaped and arranged in a substantially circular configuration.

5. The combination for suspending a linear body such as an electrical conductor comprising: a mounting device adapted to be supported by external means and being further adapted to engage at one of its ends said linear body, and an appliance composed of a linear element preshaped to include two spaced portions axially coextensive for at least a portion of their lengths, and a portion intermediate said spaced portions diagonally connecting opposite ends thereof, said intermediate portion overlying said one end of said mounting member so as to bind said linear body thereto, and said spaced portions embracing said mounting device intermediate its ends so as to secure said intermediate portion to said one end.

6. A device for suspending a linear body comprising: a support member having a groove in one end for receiving a linear body therein and an annular groove adjacent to said one end; and a lashing device composed of a plurality of linear elements intertwisted intermediate their ends to form a stranded cable, said cable being preshaped to include two spaced portions axially coextensive for at least a portion of their lengths, and an intermediate portion diagonally connecting opposite ends of said spaced portions, said spaced portions being helically preshaped adjacent their other ends to a pitch and internal diameter of sufficient magnitude that they may be applied from the side to said linear body without exceeding their elastic limits, said intermediate portion overlying said one end of said support member to confine said linear body in said groove and said helically formed portions being adapted to be wrapped around said linear body so that said spaced portions adjacent said opposite ends are resiliently bent to embrace said mounting device in said annular groove.

7. The combination for suspending a linear body such as an electrical conductor comprising: a mounting device, such as a pin type insulator, which is adapted to be supported by external means, said mounting device being adapted to engage at one of its ends a linear body; and an appliance composed of a linear element having an intermediate portion which crosses over said one end so as to bind said linear body thereto, said linear element being return bent at each end of said intermediate portion with the return bent portions embracing said mounting device intermediate its ends and being spaced relative to said intermediate portion so that the appliance grippingly engages said mounting device.

8. The combination for suspending a linear body, such as an electrical conductor, comprising: a mounting device, such as a pin type insulator, which is adapted to be supported by external means, said mounting device being adapted to engage at one of its ends a linear body; and an appliance composed of a linear element preshaped to include two spaced arcuate portions arranged in a substantially circular configuration and an intermediate portion diagonally connecting opposite ends of said arcuate portions, said intermediate portion overlying said one end of said mounting member and said arcuate portions embracing said mounting member in said annular groove.

9. A device for suspending a linear body, such as an electrical conductor, comprising: a mounting device, such as a pin type insulator, which is adapted to be supported by external means, said mounting device being adapted to engage at one of its ends a linear body; and an appliance composed of a linear element preshaped to include two spaced substantially parallel portions axially coextensive for at least a portion of their lengths, and an intermediate portion diagonally connecting opposite ends of said spaced portions, said intermediate portion overlying said one end of said mounting device and said spaced parallel portions embracing said mounting device in said annular groove.

10. The combination comprising: an electrical conductor; a pin type insulator which is adapted to be supported at one end by external means, said insulator having a saddle-like groove at its other end extending in the general direction of said electrical conductor and receiving the same, and an annular recess intermediate its ends; and an appliance composed of a plurality of linear elements which have been intertwisted for at least a portion of their lengths to form a stranded cable having a portion intermediate its ends which crosses over said saddle-like groove so as to bind said electrical conductor therein, said cable being return bent at each end of said intermediate portion with the return bent portions embracing said insulator at said annular recess and being spaced relative to said intermediate portion so that the appliance grippingly engages said insulator, said elements in at least one of said return bent portions extending outwardly from said insulator with the outwardly extending portions being helically preshaped to a mutually conforming pitch and internal diameter of sufficient magnitude that said elements may be applied to said conductor from the side without exceeding their elastic limit.

11. A device for suspending a linear body comprising: a pin like support member having a groove in one end for receiving a linear body therein, and an annular groove adjacent said one end; and a lashing device composed of a linear element preshaped to a substantially Z-shaped configuration in which the intermediate portion of said Z-shaped configuration overlies said groove in said one end to secure a linear body therein, and the horizontal portions of said Z-shaped configuration embrace said support member at said annular groove so as to secure said intermediate portion to said one end.

References Cited in the file of this patent
UNITED STATES PATENTS

| | | |
|---|---|---|
| 499,549 | Hunter et al. | June 13, 1893 |
| 708,090 | Stonebraker | Sept. 2, 1902 |
| 911,973 | Goddard | Feb. 9, 1909 |
| 1,082,751 | Kendall et al. | Dec. 30, 1913 |
| 2,205,496 | Schneider | June 25, 1940 |
| 2,225,334 | Daniels | Dec. 17, 1940 |
| 2,263,728 | Gordon et al. | Nov. 25, 1941 |
| 2,911,695 | Knight et al. | Nov. 10, 1959 |
| 2,941,029 | Stoeckel | June 14, 1960 |
| 2,947,504 | Ruhlman | Aug. 2, 1960 |